Figure 1:
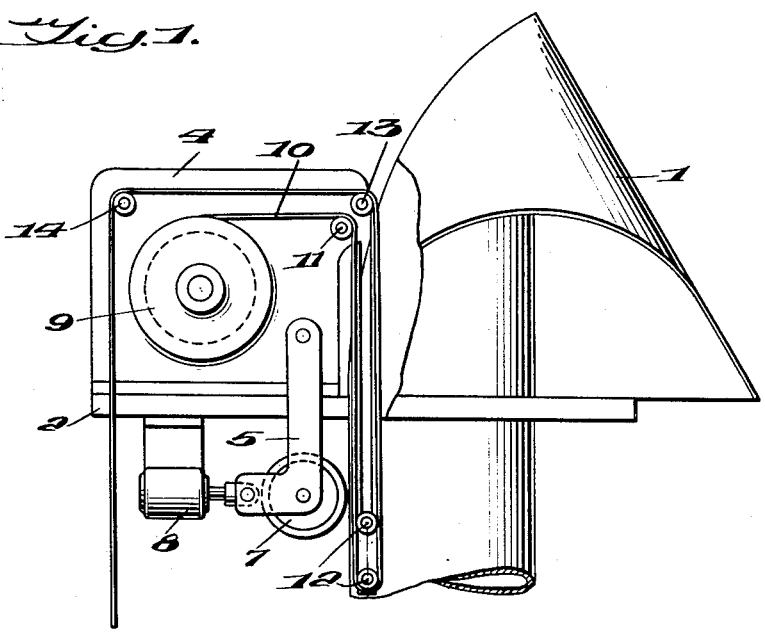

May 19, 1964

W. C. LEASURE ETAL 3,133,390

APPARATUS FOR SEALING STRIP MATERIAL

Filed Sept. 26, 1961

3 Sheets-Sheet 1

INVENTORS
W.C. LEASURE,
E.T. ANDERSON,

BY *Lawsey and Taylor*

ATTORNEYS

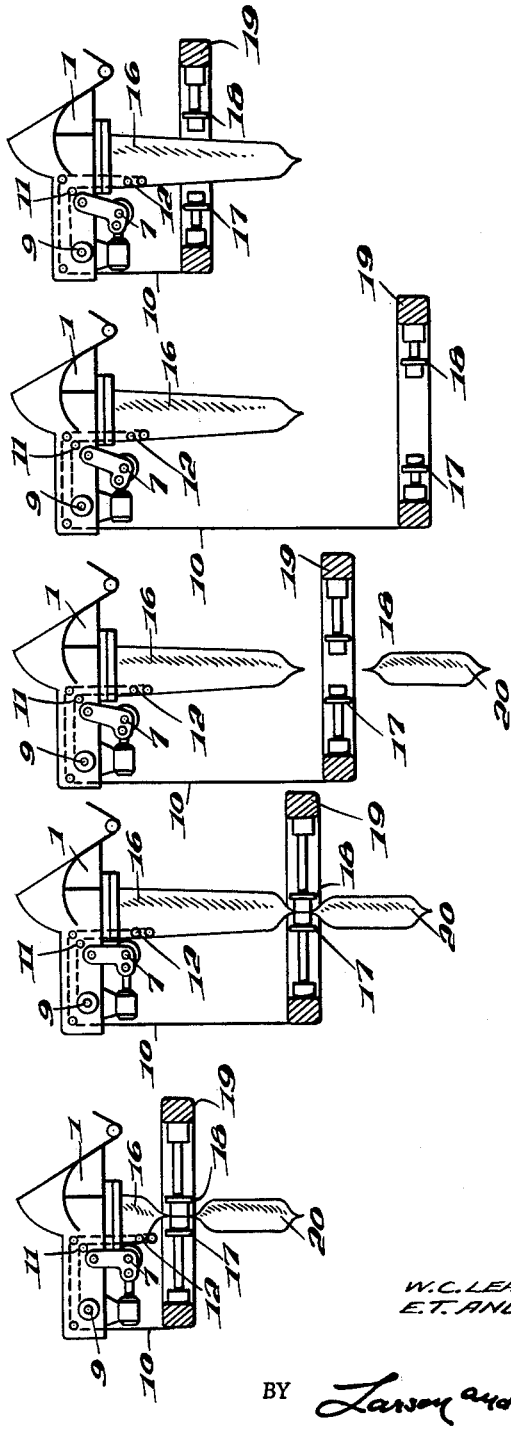

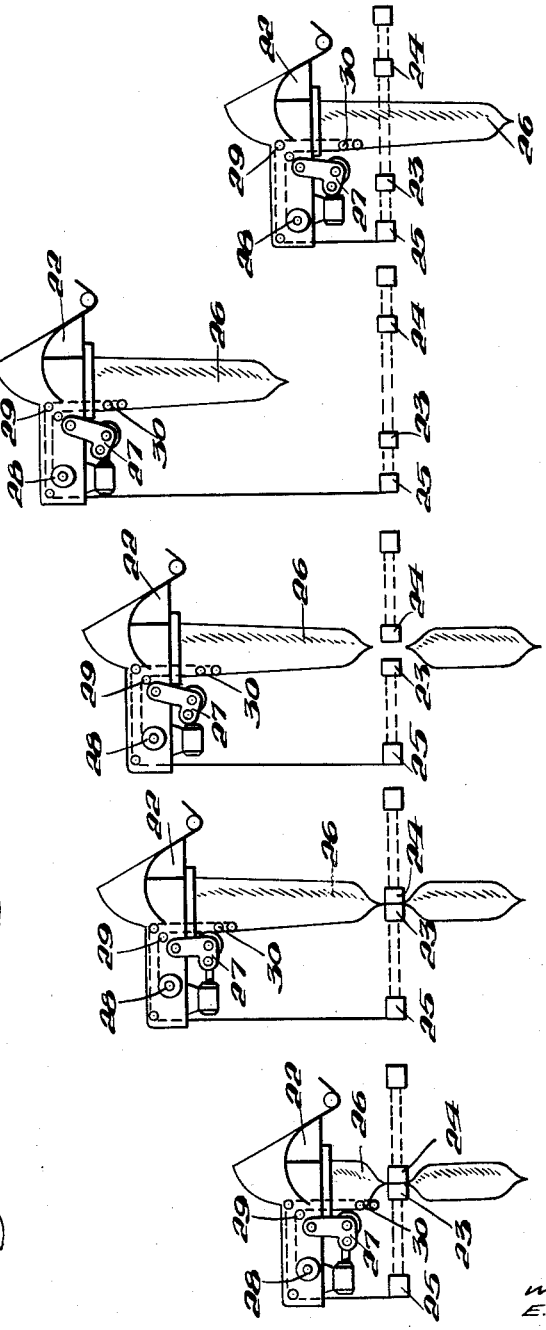

United States Patent Office 3,133,390
Patented May 19, 1964

3,133,390
APPARATUS FOR SEALING STRIP MATERIAL
William C. Leasure, 4130 Durness Way, and Ellis T. Anderson, 4910 Eppes St., both of Houston, Tex.
Filed Sept. 26, 1961, Ser. No. 140,703
4 Claims. (Cl. 53—180)

This invention relates to a method and apparatus for sealing films of strip material and more particularly to a method and apparatus for use in packaging machinery in connection with sealing plastic materials such as polyethylene or similar materials wherein the seal is formed by melting and rehardening the material itself to weld the engaged portions of the material.

The advent of plastic polyethylene and similar films brings about a need for a means of sealing such films in a manner suitable for use with automatic packaging machines.

In Patent 2,899,875 issued August 18, 1959 there is disclosed a packaging machine in which strip material is passed over an external former and is shaped in tubular form. Heat is applied to the overlapped side edges of the strip material to seal the same together. A pair of vertically reciprocating jaws are adapted to grip the material transversely of the longitudinal seal to form a transverse seal and to pull the strip material over the former and to cut the material intermediate of the transverse seal to form the top edge of one package and the bottom edge of an adjacent package.

In application Serial No. 5,916 filed February 1, 1960 now Patent No. 2,969,627, issued January 31, 1960 there is disclosed a method and apparatus for packaging in which the former reciprocates vertically and the jaws remain in a single horizontal plane and move into and out of engagement with the packaging material.

In both of the foregoing methods and apparatuses heat sealing of the longitudinal edges of the strip material is carried on continuously as the material is pulled over the former. A heating element is applied to the overlapped longitudinal edges of the strip material as it passes over a backing plate which is stationary relative to the moving film of material. This type of sealing has been found to be highly satisfactory in connection with the sealing of materials wherein an adhesive coating is applied to the packaging film, such as, for example, cellulose acetate or paper. However, difficulties have been experienced in connection with the sealing of such materials as polyethylene which do not utilize an adhesive coating but in which the film itself is melted in order to heat seal.

These difficulties stem from the fact that polyethylene has a relatively narrow softening range and a softening point close to the melting point so that a small variation in temperature has an appreciable effect on the seal formed. Furthermore, a certain length of time is required for the molten polyethylene to reharden and bond the edges of the material together. In order to allow the time necessary for the film to melt and reharden, heretofore seals have been formed only while the film remained stationary.

The presently disclosed invention overcomes the aforementioned disadvantages. By actually melting portions of the longitudinal edges of the strip material and permitting the molten material to harden in the form of a bead, the longitudinal edges will be integrated in a weld to provide a firm bond. It can be appreciated that it is not possible to achieve this result with conventional apparatus since with such conventional equipment the packaging material would melt as it passed between a relatively stationary heating element and backing plate and since the material and backing plate move relatively to each other during sealing a portion of the molten material may be deposited on the backing plate and thus disrupting the longitudinal seal. Thus with conventional apparatus the application of sufficient heat to melt the packaging material may result in a partial build up of rehardened material on the backing plate without necessarily bonding of the packaging material.

In another type of prior art sealing device an elongated heating bar is brought into contact with the overlapped longitudinal edges of the strip material for sufficient time to melt and reharden the material while the packaging material remains stationary. All movement of the packaging film occurs with the heating bar removed. This type of equipment has disadvantages in that it is difficult to maintain an even temperature over a substantial length of heating bar and furthermore it is not possible with such a device to make packages of a greater length than the length of the heating bar. It has normally been found that the heating bar pressed against the flexible material compresses the material and extrudes a portion of the melted material so that the resulting joint is thinner than the other portions of the overlapped material.

According to the present invention there is provided a heating element which is relatively short in comparison with the aforementioned heating bar and yet packaging equipments using this heating element may form bags of any length. This relatively short heating element is brought to a point adjacent the overlapped material to be sealed but not in contact therewith. There is provided a backing tape which is movable relative to the heating element and at such a rate that the relative speed is the same as the rate of movement of the movable element of the packaging machine and thus the same as the rate of bag formation. Thus the molten material and the moving tape will remain at the same position relative to the unmelted packaging material adjacent thereto. The material will melt while under the heating element and will be supported by the backing tape at the same position relative to unmelted packaging material adjacent thereto until it rehardens to weld the overlapped material together. Inasmuch as the strip material is being pulled vertically over the external former there is also a tendency for this force to pull the molten edges of the material beneath the heating element together so that there is formed a bead when the molten material rehardens, thereby reinforcing the bond.

An object of the present invention is to provide a method and apparatus for forming the longitudinal seal of packaging material such as polyethylene wherein the packaging material itself is melted and rehardens to form the seal during the bag formation.

Another object of the present invention is to provide a method and apparatus for sealing packaging materials such as polyethylene when used in automatic packaging machines wherein the sealing element is shorter than the length of the package being formed and wherein there is provided a backing tape which is maintained in the same position relative to the packaging material throughout the sealing operation.

Figure 2:
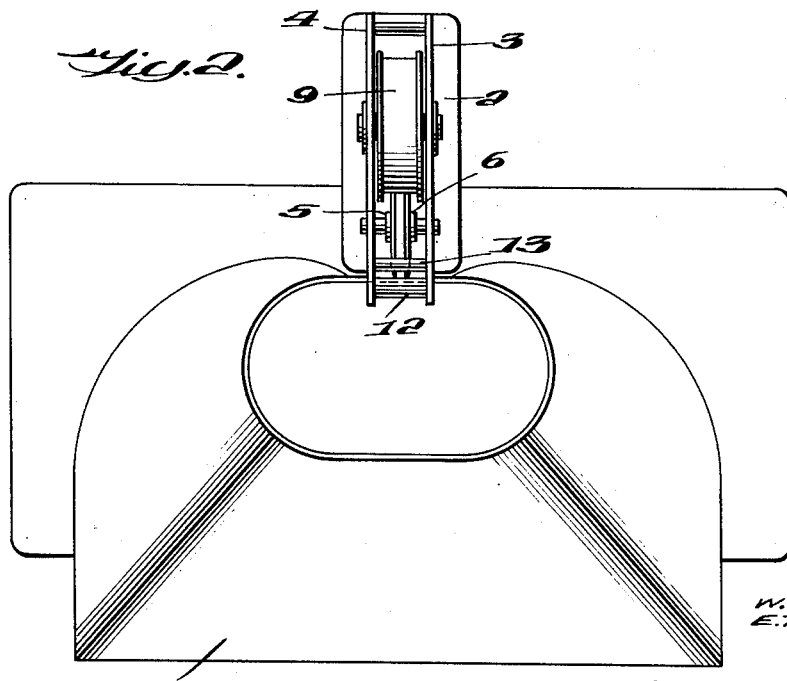

Other objects and many of the attendant advantages of the present invention will become more fully apparent upon consideration of the following detailed specification in connection with the accompanying drawings wherein:

FIG. 1 is a side elevational view of a portion of a packaging machine with a movable backing tape, FIG. 2 is a top plan view of the assembly shown in FIG. 1, FIGS. 3 to 7 inclusive are diagrammatic elevational views showing the sequence of steps in forming packages according to one embodiment of the invention, and FIGS. 8 to 12 inclusive are diagrammatic elevational views showing the sequence of steps in forming packages according to another embodiment of the invention.

Referring now more specifically to the drawings there is shown at 1 in FIG. 1 a former which is shaped in the manner clearly set forth in Patent No. 2,899,875. This former receives the packaging material in strip form and shapes it into a tubular form while supporting the material throughout the transformation. Supported on the former there is a frame 2 having a pair of uprights 3 and 4 (FIG. 2) mounted thereon. Pivotally mounted on the uprights are L shaped links 5 and 6 which support the heating element 7 which may be in the form of a roller. The short arms of the L shaped links are pivotally connected to a piston operatively mounted in a hydraulic cylinder 8. It can be readily appreciated that suitable mechanism may be provided to move the heating element 7 into and out of an operative position adjacent the packaging film at desired times during the cycle of operation.

There is also mounted between the support plates 3 and 4 a reel 9 which is mounted for rotation on the support plates and secured to the reel is a flexible tape 10. This flexible tape extends over pulley 11, a pair of pulleys 12 and thence over pulleys 13 and 14 which are rotatably mounted between support plates 3 and 4 and has the outer end thereof secured to another part of the packaging machine in a manner to be described more fully hereinafter. It can be seen from FIGS. 1 and 2 that the pulleys 12 and 13 are disposed behind the forward edge of the former. The packaging film will extend over the former 1 and the side edges of the packaging film will overlap at the forward edge of the former with that portion of the tape between pulleys 11 and 12 extending therebehind.

In FIGS. 3 to 7 there is diagrammatically shown one embodiment of a packaging apparatus to which the present invention has been applied. The former 1 is shown with packaging material disposed thereon to shape the material into tubular form as shown at 16. A pair of jaws 17 and 18 having sealing components therein are mounted in frame 19 for movement into and out of gripping relation with the packaging material to form a seal at the top and bottom of each package. The jaws may be also provided with cutter means to sever each package as it is completed. In FIG. 3 the jaws 17 and 18 are shown in engaged position and forming the transverse seal at the top of package 20 and the bottom of the next succeeding package. The frame 19 commences its movement downwardly to pull the strip material over the former as shown in FIG. 4. The cutters then operate and the jaws 17 and 18 move out of gripping position to release the completed package 20 as seen in FIG. 5. In FIG. 6 the jaws are shown as fully open and the frame 19 is at its lowermost position. The jaws then commence their movement upwardly as shown in FIG. 7 and the cycle is repeated. This type of packing equipment is known in the art and shown, for example, in the patent to Zwoyer, Patent No. 1,986,422 issued January 1, 1935.

The sealing mechanism hereinbefore described and disclosed in FIGS. 1 and 2 is applied to this packaging apparatus in the manner shown with the outer end of the flexible tape 10 attached to the vertically reciprocating frame 19 as at 21. The reel 9 is provided with internal spring means (not shown) which tends to wind the tape on the reel or to rotate the reel in a counterclockwise direction as viewed in FIG. 3. As the frame 19 moves from the position of FIG. 3 to the lowermost position of FIG. 6 the tape will be unwound from the reel and as the frame moves upwardly back to the FIG. 3 position, the spring means within the reel will rewind the tape thereon.

At the uppermost position of the frame 19 the longitudinal sealing element 7 is brought to a position in close adjacency with the overlapped edges of the strip packaging material and the hydraulic mechanism maintains the sealing element in this position throughout the downward stroke of the frame. When the frame reaches a position on its downward stroke wherein the desired bag length has been formed, the sealing element 7 is moved to a position remote from the packaging material as shown in FIG. 5.

It can be seen that as the packaging material is being pulled downwardly that portion of the tape 10 between pulleys 11 and 12 is moving in the same direction as the moving packaging material and is moving at the same speed as the moving packaging material inasmuch as the tape is being pulled along a line parallel to the line of movement of the vertically reciprocating frame. The longitudinal seal is formed by melting and rehardening portions of the overlapped side edges of the packaging material. Portions of the overlapped side edges of the packaging material melt as they pass beneath the heating element. The molten material is carried by the moving backing tape so that it remains at the same position relative to the unmelted adjacent portions of the moving packaging material until the seal is formed by the rehardening of the molten material. The downward pull on the packaging material by jaws 17 and 18 tends to bring the unmelted free edge portions of the material together in a transverse plane so that when the molten material rehardens to weld the material together a small bead is formed. The backing tape may be made of a material such as glass fiber to which the molten plastic packaging will not adhere. It can be seen that the backing tape serves as a support for the packaging material while it is in a molten state.

In FIGS. 8 to 12 there is disclosed sealing means according to the present invention applied to a packaging apparatus in which the former is moved with respect to the jaws. This type of equipment is fully described in Patent No. 2,969,627 issued January 31, 1961. A former 22 is mounted to reciprocate vertically with respect to a pair of jaws 23 and 24 which are slidably supported in a stationary frame 25. In FIG. 8 the former is shown in the lowermost position with the jaws 23 and 24 in engagement with the packaging material 26. In FIG. 9 the former 22 is shown as moving upwardly to draw the packaging material over the former into a tubular shape. In FIG. 10 the jaws 23 and 24 are shown moving to a releasing position and in FIG. 11 the former is shown as continuing the upward movement in an overstroking motion, the purpose of which is more fully set forth in the prior patent referred to hereinbefore. In FIG. 12 the former 22 is shown as having moved to the lowermost position with the tubular shaped packaging material extending between the open jaws 23 and 24.

The sealing mechanism 27 and backing tape 28 is identical to that disclosed in FIGS. 1 and 2. The end of the backing tape is secured to the frame 25 and it can be seen that the tape will be unwound from the reel as the former moves upwardly. That portion of the tape between pulleys 29 and 30 will be travelling with respect to the former in the same direction and at the same speed as the packaging material. Hence each point on the backing tape remains in the same position relative to each segment of packaging material, forming a supporting surface for the molten material.

In both of the embodiments of packaging machines hereinbefore described a backing tape is provided for the overlapped side edges of the packaging film. This backing tape moves with the packaging film so as to form, in effect, a stationary supporting surface for the molten film during the time required for the film to harden and form a bond between the overlapped edges of the film. The heating element may be relatively short and yet the presently disclosed apparatus and method may be used with any length package desired.

Obviously many modifications and variations of the present invention are possible in light of the foregoing teachings. What is claimed as new and desired to be secured by Letters Patent is:

1. Packaging apparatus comprising, in combination, a former for shaping strip material into tubular form, a pair of jaws mounted for movement into and out of clamping relation with respect to the tubular shaped material for forming a transverse seal and separating independent packages, means for reciprocating said jaws with respect to the stationary former for pulling the material over the former, a heating element, means mounting said heating element for movement into and out of heat sealing relation with respect to the material, a reel having one end of a tape secured thereto, the other end of the tape being secured to said reciprocating means whereby the tape is unwound from the reel when said reciprocating means pulls the material over the former, a portion of said tape being disposed beneath the material to form a support during heat sealing, the tape moving in the same direction and at the same speed as the material.

2. Packaging apparatus of the class described comprising a former for shaping strip material into tubular form with the longitudinal edges of the strip material disposed in overlapping relation, a heating element adapted to seal the overlapping longitudinal edges of the material, a pair of sealing jaws adapted to reciprocate into and out of sealing relation with respect to the tubular formed material, means for moving the former along the longitudinal axis of the tubular formed material, means mounting the heating element for movement with the former so as to move the heating element over the overlapping edges of the material, and a backing means for the material comprising a reel rotatably mounted on the former and a tape wound on the reel and passing over rollers so as to pass in adjacency to the overlapped longitudinal edges of the material on the side of the material opposite to the heating element, the end of said tape being fixed to the apparatus whereby as the former moves to draw material thereover and in adjacency to the heating element, the tape is unwound from the reel and a portion thereof forms a backing for the material, the backing and material being stationary with respect to each other.

3. A packaging machine for forming packages from strip material comprising a former for shaping strip packaging material into generally tubular form, with the side edges of the material being in overlapping relation, a pair of sealing jaws for forming transverse seals at the top and bottom of packages formed from the tubular shaped material, means for reciprocating the sealing jaws for advancing the strip material over said former along the longitudinal axis of the tubular formed packaging material to form successive lengths of tubular shaped material, and means for sealing the overlapping side edges of the material together, said means comprising a heating element mounted adjacent one face of the overlapping edges of the material and a backing member mounted on said former adjacent the other face of the overlapping side edges of the material, and means mounting said backing member for movement for a substantial distance in the same direction as the material moves and parallel to the longitudinal axis of the tubular formed material, said backing member being connected to said reciprocating means for said sealing jaws whereby the reciprocating means moves the backing member and the material, the overlapping side edges of the film heated by said heating element being stationary relative to the backing member.

4. A packaging machine for forming packages from strip material comprising a former for shaping strip packaging material into generally tubular form, with the side edges of the material being in overlapping relation, a pair of sealing jaws for forming transverse seals at the top and bottom of packages formed from the tubular shaped material, means for reciprocating the former for advancing the strip material over said former to form successive lengths of tubular shaped material, and means for sealing the overlapping side edges of the material together, said means comprising a heating element mounted on said former adjacent one face of the overlapping edges of the material and a backing member mounted on said former adjacent the other face of the overlapping side edges of the material, and means mounting said backing member for movement for a substantial distance in a direction parallel to the longitudinal axis of the tubular formed material, said backing member being connected with a stationary part of said machine whereby the reciprocating means moves the backing member as the material is drawn over the former, the overlapping side edges of the film heated by said heating element being stationary relative to the backing member as the material is drawn over the former by said advancing means.

References Cited in the file of this patent

UNITED STATES PATENTS

| | | |
|---|---|---|
| 2,679,195 | Whytlaw | May 25, 1954 |
| 2,815,620 | Prodigo | Dec. 10, 1957 |
| 2,828,239 | Fischer | Mar. 25, 1958 |
| 2,832,271 | Jarund | Apr. 29, 1958 |
| 2,893,296 | Yovanovich | July 7, 1959 |
| 2,899,875 | Leasure | Aug. 18, 1959 |
| 2,969,627 | Leasure | Jan. 31, 1961 |